US011886563B2

(12) United States Patent
Malton et al.

(10) Patent No.: US 11,886,563 B2
(45) Date of Patent: *Jan. 30, 2024

(54) CONTINUOUS AUTHENTICATION SYSTEM AND RELATED METHODS

(71) Applicant: BlackBerry Limited, Waterloo (CA)

(72) Inventors: Andrew James Malton, Waterloo (CA); Andrew Eric Walenstein, Issaquah, WA (US)

(73) Assignee: BlackBerry Limited, Waterloo (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/109,329

(22) Filed: Feb. 14, 2023

(65) Prior Publication Data

US 2023/0195873 A1     Jun. 22, 2023

Related U.S. Application Data

(63) Continuation of application No. 16/719,258, filed on Dec. 18, 2019, now Pat. No. 11,599,611.

(51) Int. Cl.
*G06F 21/00*        (2013.01)
*G06F 21/32*        (2013.01)
*G06F 21/31*        (2013.01)

(52) U.S. Cl.
CPC .......... *G06F 21/32* (2013.01); *G06F 21/316* (2013.01); *G06F 2221/2103* (2013.01); *G06F 2221/2113* (2013.01); *G06F 2221/2139* (2013.01)

(58) Field of Classification Search
CPC ............... G06F 21/32; G06F 21/316; G06F 2221/2103; G06F 2221/2113;

(Continued)

(56) References Cited

U.S. PATENT DOCUMENTS 8,925,053 B1    12/2014   Mehta
9,426,139 B1    8/2016    Mcclintock
(Continued)

FOREIGN PATENT DOCUMENTS

WO     2016105553 A1    6/2016

OTHER PUBLICATIONS

Extended European Search Report; EP20213087.8 dated Feb. 4, 2021.

(Continued)

*Primary Examiner* — Brandon Hoffman
*Assistant Examiner* — William A Corum, Jr.
(74) *Attorney, Agent, or Firm* — Trop Pruner & Hu, P.C.

(57) ABSTRACT

A continuous authentication system and related methods are provided. The system detects requests to perform user actions. A security value is associated with each user action. The system determines a subsequent session security level in response to an adjustment to a session security level by a security value of a requested user action. The requested user action is permitted and the session security level is adjusted based on the security value of the requested user action in response to a determination by the system that the subsequent session security level is greater than or equal to a threshold session security level. A user authentication challenge is caused (e.g., prompted) in response to a determination by the system that the subsequent session security level is less than the threshold session security level. The requested user action is permitted and the session security level is adjusted based on the security value of the requested user action in response to a successful user authentication challenge. The requested user action is rejected in response to an unsuccessful user authentication challenge.

20 Claims, 5 Drawing Sheets

(58) Field of Classification Search
CPC ............ G06F 2221/2139; G06F 21/31; H04W 12/06; H04L 63/08
See application file for complete search history.

(56) References Cited

U.S. PATENT DOCUMENTS

| | | | |
|---|---|---|---|
| 2017/0118223 A1* | 4/2017 | Mathew | ................ G06F 21/31 |
| 2017/0193211 A1* | 7/2017 | Blake | ............... H04M 1/72436 |
| 2018/0013782 A1 | 1/2018 | Choyi et al. | |
| 2021/0194883 A1* | 6/2021 | Badhwar | .............. H04L 63/107 |

OTHER PUBLICATIONS

Office Action; U.S. Appl. No. 16/719,258 dated Jul. 12, 2022.
Notice of Allowance; U.S. Appl. No. 16/719,258 dated Nov. 2, 2022.

* cited by examiner

400

Authentication Request

| Authentication Is Required | |  |
|---|---|---|
| Please confirm identity | | |
| Username | Bob1 | ▼ |
| Password | ***** | ▼ |
| PIN | — | |

FIG. 4

CONTINUOUS AUTHENTICATION SYSTEM AND RELATED METHODS

RELATED APPLICATION DATA

The present application is a continuation of non-provisional patent application Ser. No. 16/719,258, filed Dec. 18, 2019, the content of which is incorporated herein by reference.

TECHNICAL FIELD

The present disclosure relates generally to authentication systems, and more particularly to a continuous authentication system and related methods.

BACKGROUND

Authentication systems are common parts of consumer and enterprise computing devices. Authentication systems may attempt to re-authenticate users after an initial authentication to ensure the user has not changed. Some common approaches are to re-authenticate a user after a threshold period of time since a previous successful authentication or in response to certainty types of actions. Although partly effective, these approaches are not able to all types of detect unauthorized access or are not able to detect unauthorized access before data has been exposed to unauthorized users or systems. For this and other reasons, there is a need for improved authentication systems.

BRIEF DESCRIPTION OF THE DRAWINGS

FIG. 4 is a user interface screen for prompting user authentication in accordance with an example embodiment of the present disclosure.

DETAILED DESCRIPTION OF EXAMPLE EMBODIMENTS

Figure 1:
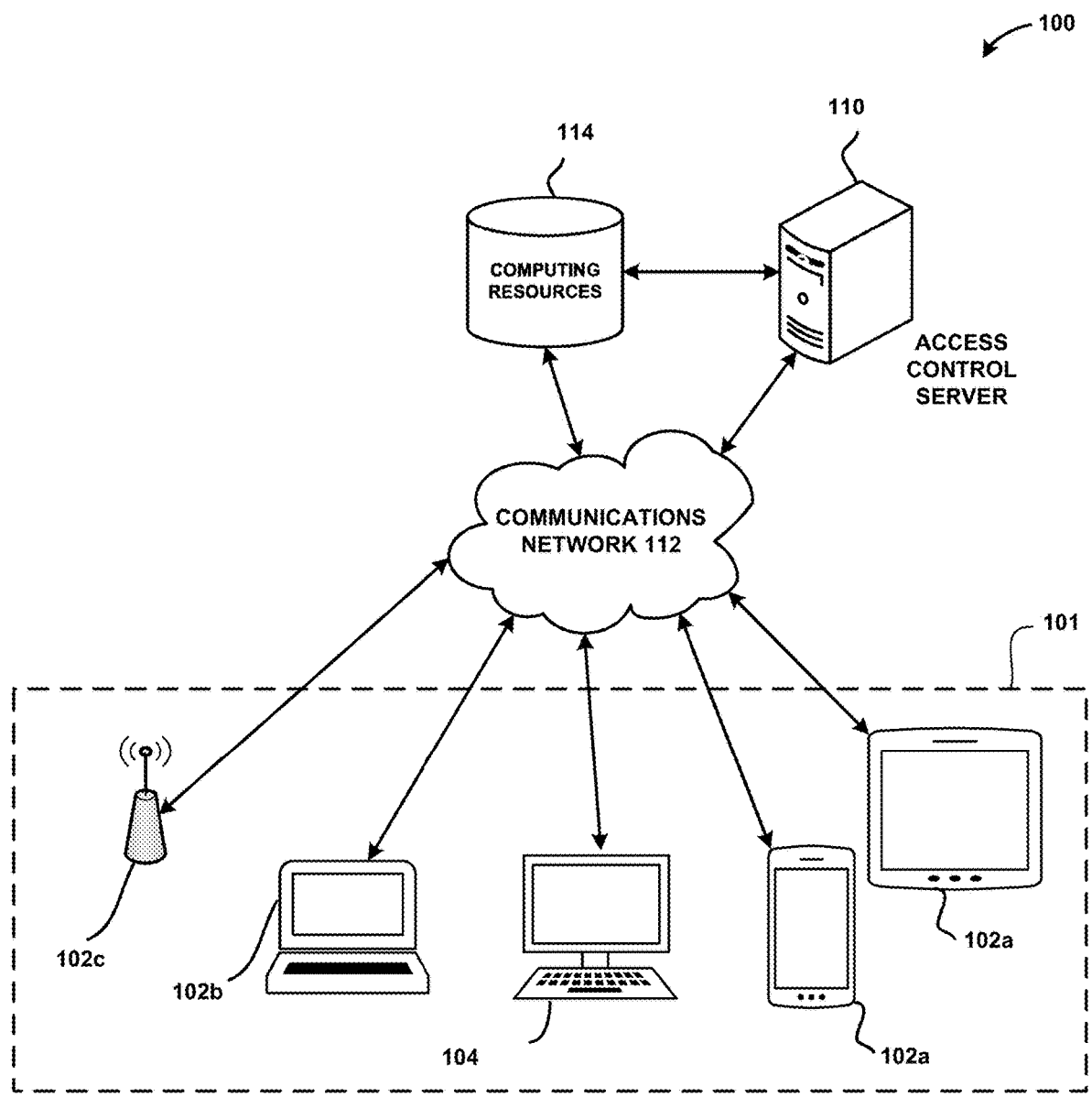
FIG. 1 is a simplified block diagram of a computing environment in which example embodiments of the present disclosure may be carried out.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except wherein indicated otherwise either explicitly or inherently by context.

The present disclosure provides a continuous authentication system and related methods. Authentication is performed continuously within a login session or "in-session". The system detects requests to perform user actions. A security value is associated with each user action. The system determines a subsequent session security level in response to an adjustment to a session security level by a security value of a requested user action. The requested user action is permitted and the session security level is adjusted based on the security value of the requested user action in response to a determination by the system that the subsequent session security level is greater than or equal to a threshold session security level. A user authentication challenge (e.g., re-authentication action) is caused (e.g., prompted) in response to a determination by the system that the subsequent session security level is less than the threshold session security level. The requested user action is permitted and the session security level is adjusted based on the security value of the requested user action in response to a successful user authentication challenge. The requested user action is rejected in response to an unsuccessful user authentication challenge. Alternatively, the system may operate based on the current session security level rather than the subsequent session security level.

In accordance with one aspect of the present disclosure, there is provided a continuous authentication method, comprising: detecting a request to perform a user action; determining a subsequent session security level in response to an adjustment of a session security level by a security value of the requested user action; permitting the requested user action and adjust the session security level based on the security value of the requested user action in response to a determination that the subsequent session security level is greater than or equal to a threshold session security level; causing a user authentication challenge in response to a determination that the session security level is less than the threshold session security level; permitting the requested user action and adjust the session security level based on one or both of the security value of the requested user action and a security value of a successful user authentication challenge in response to a successful user authentication challenge; and rejecting the requested user action in response to an unsuccessful user authentication challenge.

In some examples, each type of user action has a security value, wherein the security value of each type of user action is based on a time of inactivity measured from a last user action of the respective type.

In some examples, the security value is gradually increased based on the time of inactivity measured from the last user action of the respective type.

In some examples, the session security level is based on a time of inactivity measured from a last user action.

In some examples, the session security level is gradually decreased based on the time of inactivity measured from the last user action.

In some examples, each user action type is an explicit security action, an implicit security action, or a non-security action.

In some examples, an explicit security action comprises a re-authentication action, an implicit security action comprises a non-resource specific user action, and a non-security action comprises a resource specific user action.

In some examples, an implicit security action is an implicit re-authentication action based on one or more of session information or biometric information.

In some examples, the biometric information comprises any one or more of a typing speed, a typing cadence, a clicking speed, a clicking cadence, gait, finger print or eye scan.

In some examples, the session information comprises any one or more of an idle time duration, a user activity rate, or a session duration.

In some examples, the non-security actions comprises any one of a document access or idle time duration.

In some examples, the document access comprises any one or more of a document read, a document write, a document copy, a document delete, a document move, or a document profile change.

In some examples, the security value is based at least in part on a resource associated with the user action.

In some examples, the session security level is associated with a user account of the session.

In some examples, the security value is dynamically determined based on the user actions within the session.

In some examples, the session security level is increased in response to the security value being positive, wherein the session security level is decreased in response to the security value being negative, and wherein the session security level is unchanged in response to the security value being neutral.

In some examples, the session security level is adjusted in response to each permitted user action.

In accordance with another aspect of the present disclosure, there is provided a continuous authentication method, comprising: detecting a request to perform a user action; permitting a requested user action and adjusting a session security level based on a security value of the user action in response to a determination that a session security level is greater than or equal to a threshold session security level; causing a user authentication challenge in response to a determination that the session security level is less than the threshold session security level; permitting the requested user action and adjust the session security level based on one or both of the security value of the requested user action and a security value of a successful user authentication challenge in response to a successful user authentication challenge; and rejecting the requested user action in response to an unsuccessful user authentication challenge.

In accordance with a further aspect of the present disclosure, there is provided a computing device having a processor and a memory coupled to the processor, the memory having tangibly stored thereon executable instructions for execution by the processor, wherein the executable instructions, when executed by the processor, cause the computing device to perform the methods described herein.

In accordance with yet a further aspect of the present disclosure, there is provided a non-transitory machine readable medium having tangibly stored thereon executable instructions for execution by a processor of a computing device, wherein the executable instructions, when executed by the processor, cause the computing device to perform the methods described herein.

Authentication System

Reference is first made to FIG. 1 which shows in simplified block diagram form of an authentication system 100 in which example embodiments of a continuous authentication method of the present disclosure may be carried out. The authentication system 100 comprises a communications network 112 that enables a plurality of communication devices 101 to exchange data. The communication devices 101 may connect to one or more servers 110 (only one of which is shown in FIG. 1) and/or one or more computing resources 114 coupled to the communications network 112. The computing resources 114 may be databases. The servers 110 and computing resources 114 may be locate behind a firewall (not shown).

The communications network 112 may be any type of network capable of enabling a plurality of communication devices 101 to exchange data such as, for example, a local area network (LAN), such as a wireless local area network (WLAN) such as Wi-Fi™, used in a work office environment, a wireless personal area network (WPAN), such as Bluetooth™ based WPAN, a wide area network (WAN), a public-switched telephone network (PSTN), or a public-land mobile network (PLMN), which is also referred to as a wireless wide area network (WWAN) or a cellular network. The communications network 112 may comprise a plurality of the aforementioned network types coupled via appropriate methods known in the art.

The communication devices 101 and servers 110 may communicate securely using, for example, Transport Layer Security (TLS) or its predecessor Secure Sockets Layer (SSL). TLS and SSL are cryptographic protocols which provide communications security over the Internet. TLS and SSL encrypt network connections above the transport layer using symmetric cryptography for privacy and a keyed message authentication code for message reliability. The communication devices 101 and servers 110 are provided with encryption key(s) for secure communications using TSL or SSL, which are typically stored in persistent memory of the communication devices 101 and servers 110.

The communication devices 101 may comprise one or more mobile wireless communications devices ("mobile devices") 102, one or more personal computers 104, one or more security devices 106 or a combination thereof. The mobile devices 102 may comprise, but are not limited to, handheld wireless communications devices represented by reference 102a, such as smartphones or tablets, laptop or notebook computers (also known as a netbook or ultrabook computer depending on the device capabilities) represented by reference 102b, or a combination thereof. The security devices 106 may be a security access device 102c such as a security access terminal, security card (e.g., smart card) reader, biometric scanner/reader (e.g., voice scan/print, face scan/print, finger or palm scan/print, gait scan/print etc.), camera (still or video), or other suitable device.

The mobile devices 102 may include a vehicle computing device (not shown). The mobile devices 102 may include devices equipped for cellular communication through PLMN or PSTN, mobile devices equipped for Wi-Fi™ communications over WLAN or WAN, or dual-mode devices capable of both cellular and Wi-Fi™ communications. The mobile devices 102 may also be equipped for Bluetooth™ and/or NFC (near-field communication) communications.

The computers 104 and servers 110 may include any computing device equipped for communicating over LAN, WLAN, Bluetooth, WAN, PSTN, PLMN, or any combination thereof. For example, the computers 104 may be a personal computer such as a desktop computer. Although FIG. 1 illustrates the authentication system 100 as having a certain number of communication devices 101 and servers 110, this is for illustrative purposes only. The authentication system 100 may comprise any number of communication devices 101 and servers 110 of the various types.

The servers 110 may be connected to the computing resources 114, either directly or through the communications network 112. The computing resources 114 comprise a plurality of data files that may be physically located either locally or remotely from the servers 110. The computing resources 114 may be a module of the servers 110. The servers 110 and computing resources 114 may be implemented in a virtualized environment such that, although depicted as a single block in FIG. 1, the servers 110 and computing resources 114 may be implemented across a number of devices in a cloud computing environment.

Figure 2:
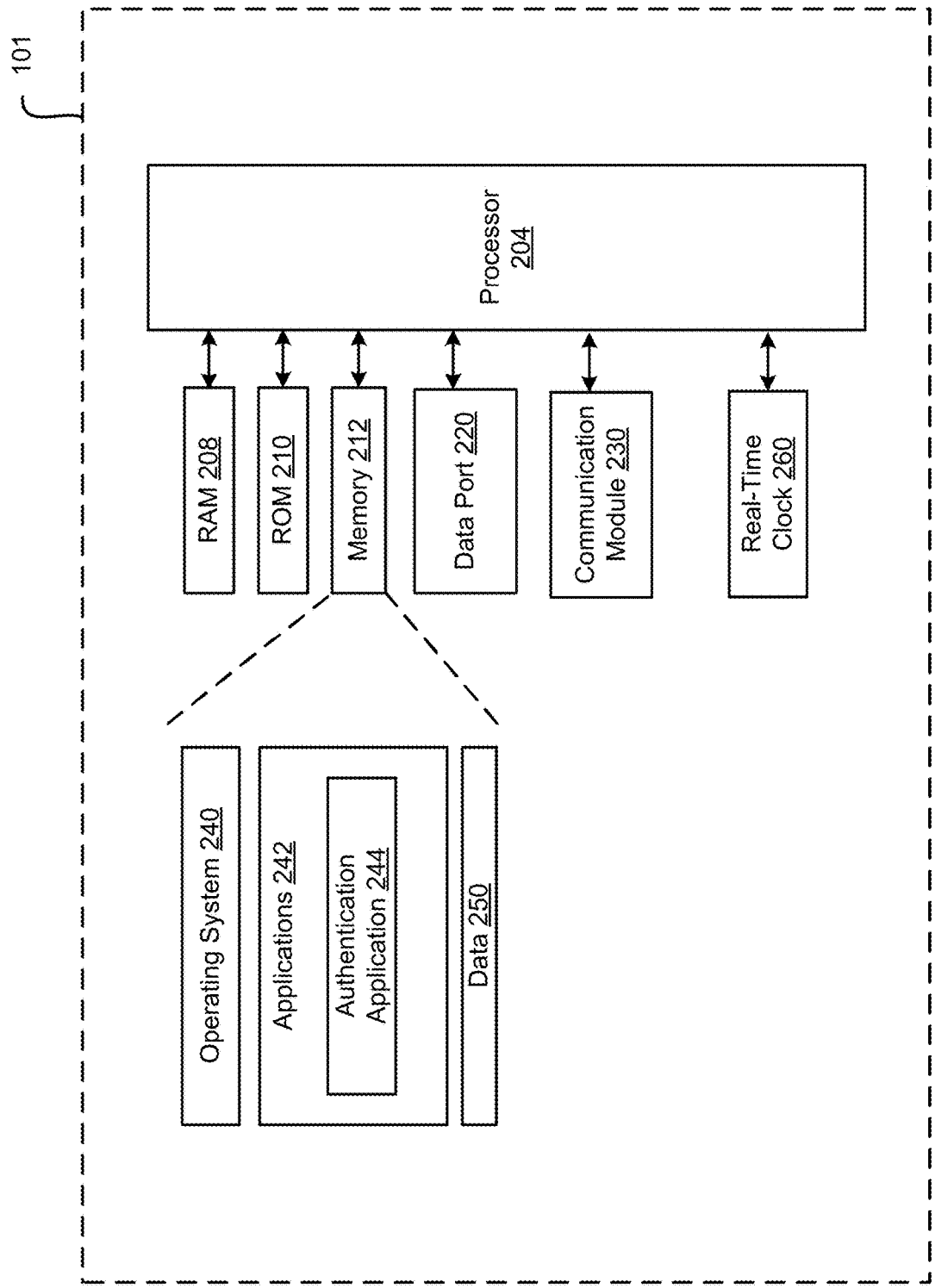
FIG. 2 is a simplified block diagram of a computing device suitable for practicing example embodiments of the present disclosure.

Referring now to FIG. 2 an example of a computing device 200 suitable for practicing example embodiments of the present disclosure. The computing device 200 may be a communication device 101 or a server 110. The computing device 200 comprises at least one processor 204 which controls the overall operation of the computing device 200. The processor 204 is coupled to a plurality of components via a communication bus (not shown) which provides a communication path between the components and the processor 204. The computing device 200 also comprises a Random Access Memory (RAM) 208, Read Only Memory (ROM) 210, a persistent (non-volatile) memory 212 which may be flash erasable programmable read only memory (EPROM) ("flash memory") or other suitable form of memory, a data port 220 such as a serial data port (e.g., Universal Serial Bus (USB) data port), communication module 230 and a real-time clock (RTC) 260.

The communication module 230 may comprise any combination of a long-range wireless communication module, a short-range wireless communication module, or a wired communication module (e.g., Ethernet or the like). The long-range wireless communication module comprises one or more radio frequency (RF) transceivers for communicating with a radio access network (e.g., cellular network). The RF transceivers may communicate with any one of a plurality of fixed transceiver base stations of a cellular network within its geographic coverage area. The long-range wireless communication module may also comprise a wireless local area network (WLAN) transceiver for communicating with a WLAN via a WLAN access point (AP). The WLAN may comprise a Wi-Fi wireless network which conforms to IEEE 802.11x standards (sometimes referred to as Wi-Fi®) or other communication protocol. The short-range communication module may comprise devices, associated circuits and components for providing various types of short-range wireless communication such as Bluetooth™, RFID (radio frequency identification), near field communication (NFC), IEEE 802.15.3a (also referred to as UltraWideband (UWB)), Z-Wave, ZigBee, ANT/ANT+ or infrared (e.g., Infrared Data Association (IrDA) communication).

The communication module 230 of the computing device 200 may comprise one or more antennas, a processor such as a digital signal processor (DSP), and local oscillators (LOs). The specific design and implementation of the communication module 230 is dependent upon the communication technologies implemented by the computing device 200. Data received by the computing device 200 may be decompressed and decrypted by a decoder (not shown).

Operating system software 240 executed by the processor 204 is stored in the persistent memory 212 but may be stored in other types of memory devices, such as ROM 208 or similar storage element. A number of applications 242 executed by the processor 204 are also stored in the persistent memory 212. The applications 242 may include an authentication application 244. Other applications are also stored in the memory 126. The authentication application 244, when executed by the processor 204, allows the computing device 200 to perform the methods described herein. In other embodiments, the authentication application 244 may be stored remotely, for example on a server 110, for cloud-based deployment.

The authentication application 244 may be capable of being operated by the computing device 200 while other applications are in operation, for example, by running in the background. The authentication application 244 may be configured to be able to collect data from other running applications regarding user actions and use the collected data to carry out the methods described herein. The authentication application 244 may be part of the operating system software 240, for example, a part of security software that performs authentication, an inactivity countdown timer and lockout, or a separate application.

The authentication application 244 detects user actions, store metadata pertaining to user actions, and cause (e.g., prompt) user authentication challenges (e.g., re-authentication actions). The authentication application 244 may continually monitor user actions and requested user actions throughout a session, determine whether a user authentication challenge is appropriate based on the user actions and/or requested user actions, and adjust a session security level based on user actions during a session in addition to known features of an authentication method. The operation of such features and functions is described more fully below.

Continuous Authentication Method

The present disclosure provides a continuous authentication system and related methods in which authentication is performed continuously within a login session. The method may be performed by a computing device 200, such as a smartphone, tablet or personal computer, or possibly an access control server 110 which monitors activity on a computing device 200.

Each session has a session security level which may vary continuously over time depending on a combination of one or more of past user behavior of a respective user such as a one or more past user actions (or user action/action), predicted user behavior of the respective user such as one or more predicted user actions, a requested action of the respective user, a context in which past user behavior occurred, or a context in which a requested action occurred. The action may relate to the computing device 200 or a connected device such as the communication devices 101 or the access control server 110. Each action has a security value (or cost) which may be positive, negative or zero/neutral. Examples of actions that have a negative security value that reduces the session security level include accessing a secure or sensitive file detected by the access control server 110, entering a secure area detected by the security access device 102c, invoking security settings on the computing device 200, or leaving an authenticated endpoint (e.g., computer device 200) idle and unattended.

The computing device 200 (or access control server 110), before permitting an attempted action, considers the current session security level with respect to a threshold security level as a measure of risk of permitted the attempted action. If the current security level is greater than or equal to the threshold security level, the risk is determined to be acceptable and the attempted action is permitted (or allowed). If the current security level is less than the threshold security level, the risk is determined to be unacceptable and user authentication challenge (e.g., re-authentication action) is caused or invoked. A successful user authentication challenge increases the session security level above the threshold security level, and the attempted action is permitted.

Figure 3A:
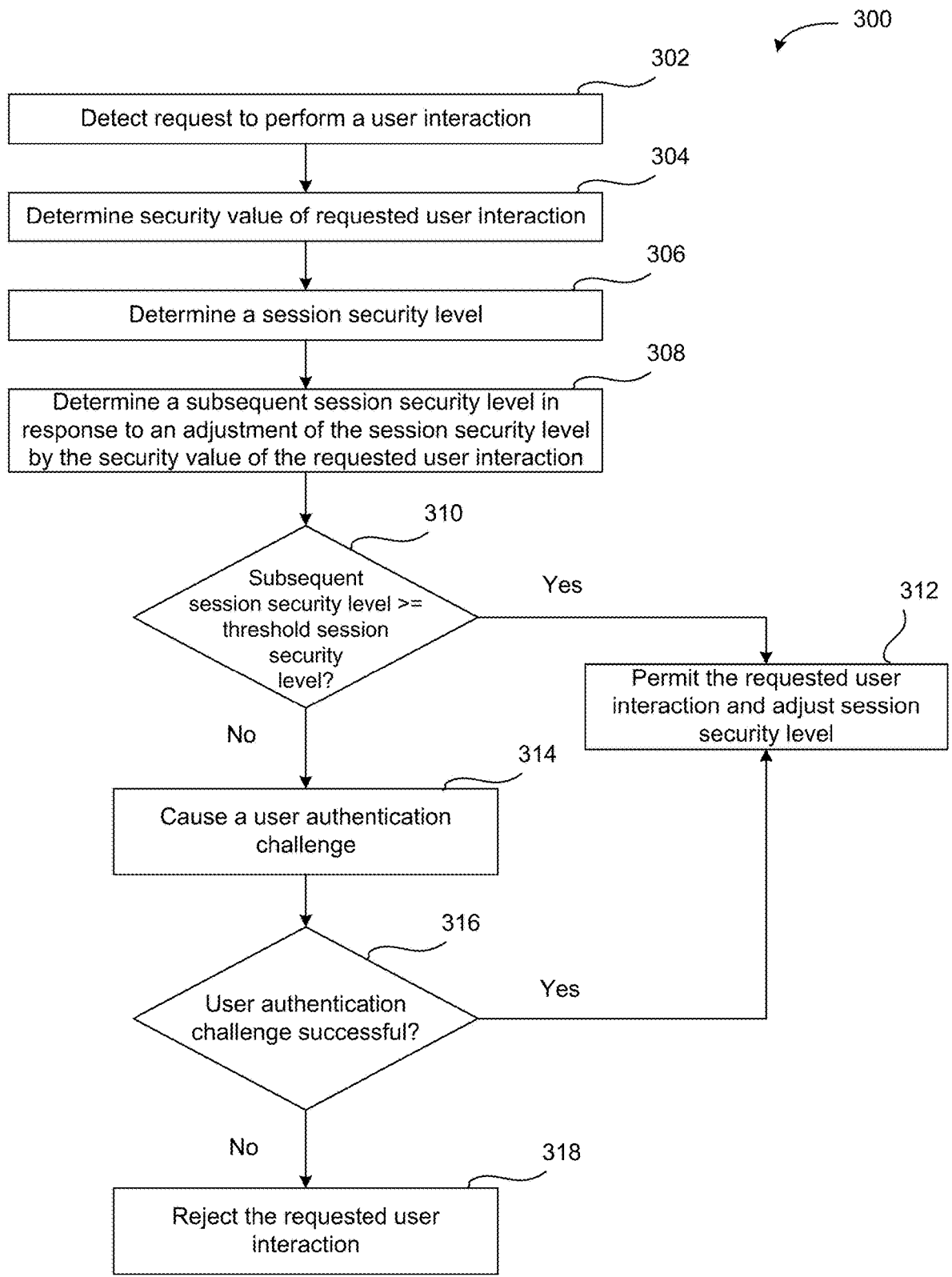
FIG. 3A is a flowchart of a continuous authentication method in accordance with one example embodiment of the present disclosure.

Referring now to FIG. 3A a continuous authentication method 300 in accordance with one example embodiment of the present disclosure will be described. The method 300 may be carried out by software executed, for example, by a processor 204 of a computing device 200 illustrated in FIG. 2. The method 300 is performed within a login session. A login session (hereinafter "session" for convenience) is the period of activity between a user logging in and logging out of a computing device and/or system such as the computing device 200. The computing device and/or system may exist in a single or multi-user environment. For example, the computing device 200 may be associated with a network, such as an enterprise network, having a plurality of users. Each session has an associated session security level. Each session commences with an initial session security level that may be increased or decreased based on user actions based on a security value associated with the user actions, which may vary between different types of user actions. The initial session security level may vary between users within a user population (such as an enterprise) or between users of different user groups of a user population (with each user in the same user group having the same initial session security level). Alternatively, the initial session security level may be the same for all users within a user population.

At operation 302, the computing device 200 detects a request to perform a user action. The computing device 200 is configured to detect each user action request and to determine a respective type of the requested user action. In some examples, each user action type is classified as one of an explicit security action, an implicit security action, or a non-security action (or ordinary action).

An explicit security action comprises a re-authentication action such as a successful or unsuccessful user authentication challenge. A successful user authentication challenge has a positive security value that raises the session security level whereas an unsuccessful user authentication challenge has a negative security value that lowers the session security level. In some examples, the security value of a successful user authentication challenge may raise the session security level to a predetermined amount, such as the initial session security level for the user. In other examples, the security value of a successful user authentication challenge may be a predetermined amount. Conversely, in some examples the security value of an unsuccessful user authentication challenge may reduce the session security level to a predetermined amount, such as an amount below the threshold security level, for example zero. It is contemplated that a user authentication challenge may be invoked in response to events other than the session security level being below the amount below the threshold security level. Accordingly, the session security level may be above the threshold security level when a user authentication challenge occurs. The explicit security action comprises an An implicit security action comprises a non-resource specific user action (e.g., non-file specific user action). An implicit security action may comprise an implicit user authentication challenge based on any one or more of session information, biometric information or other passive information or characteristics. An implicit user authentication challenge is based information passively collected about the user or user actions during the session using sensors and/or input received from the user rather than an explicit implicit user authentication challenge in an explicit security action in which the session is temporarily suspended and a prompt for authentication information is generated. The session information may comprise any one or more of an idle time duration, a user activity rate, or a session duration. The biometric information may comprise any one or more of a typing speed, typing cadence, clicking speed, clicking cadence, gait profile, fingerprint profile, facial profile, eye scan profile, voice pattern, or other suitable biometric information.

A non-security action (or ordinary action) comprises a resource specific user action. The non-security actions may comprise any one of a document access, idle time duration, viewing website via a web browser, downloading an application, playing a song via a music player application, etc. The document access may comprise any one or more of a document read, a document write, a document copy, a document delete, a document move, or a document profile change. The document(s) associated with the document access may be locally stored documents in a memory of the computing device 200 or network documents stored in computing resources 114 and accessed by the computing device 200 via the access control server 110.

At operation 304, the computing device 200 determines a security value (or cost) of the requested user action. The security value varies based on one or both of the user action type of the requested user action and the particular requested user action. The security value may be based at least in part on a resource associated with the user action. The security value may be fixed or dynamically determined based on the user actions within the session as described above.

The security value of an action may be based on processing cost (e.g., time, battery, bandwidth, etc.), convenience to the user (e.g., unnoticed, interruption, session termination, etc.) and a security assessment of the action (e.g., increased risk, reduced risk, low risk, medium risk, high risk, etc.). For example, with respect to re-authentication actions, re-authentication actions such as password entry have a small processing cost, a middling inconvenience, and adequate general level of security achievement. This may be contrasted with second-factor password transmitted by another channel (e.g., sent by SMS and copied to an application) has a higher cost, a higher inconvenience, and a higher corresponding security achievement.

The security value may be fixed or vary based on a time of inactivity measured from a last user action. In some examples, each type of user action has a security value, and the security value of each type of user action is based on a time of inactivity measured from a last user action of the respective type. The security value may be gradually increased based on the time of inactivity measured from the last user action or the last user action of the same respective type, depending on the embodiment. This approach implies a security value/cost to user inactivity, which may be an indication that the user has left the computing device 200 unattended, and therefore, unsecure.

As described above, examples of actions that have a negative security value that reduces the session security level may include accessing a secure or sensitive file detected by the access control server 110, entering a secure area detected by the security access device 102c, invoking security settings on the computing device 200, or leaving an authenticated endpoint (e.g., computer device 200) idle and unattended.

At operation 306, the computing device 200 determines the (current) session security level. The session security level is associated with a user account of the session. As described above, the session security level varies throughout the session in response to various user actions. Each session commences with an initial session security level that may be increased or decreased based on user actions based on the security value associated with the user actions. The session security level may be adjusted in response to each permitted user action. The session security level is increased in response to the security value being positive, wherein the session security level is decreased in response to the security value being negative, and wherein the session security level is unchanged in response to the security value being neutral. The session security level may also be gradually decreased based on the time of inactivity measured from the last user action or the last user action of the same respective type, depending on the embodiment.

At operation 308, the computing device 200 determines a subsequent session security level in response to an adjustment of the session security level by the security value of the requested user action. The subsequent session security level is an adjusted session security level that would result if the requested user action is permitted/allowed. The use of a subsequent session security level allows the impact of the security value of the requested user action to be evaluated before the requested user action is permitted/allowed. For example, if the current session security level is low and the security value (or cost) is high, the request to perform a user action may be rejected/denied because the user has insufficient security "credit". This approach prevents high value/high cost user actions from being performed by a user has low security "credit" relative to the security value/cost of the requested user action. By appropriately setting the security values and security levels, the IT system administrator may limit the possibility for authorized accessed without unduly interfering with user behavior and user work efficiency. The IT system administrator may set initial session security levels for users in the user population, security values/costs, and a threshold session, and which may be varied over time based on individual user behavior, behavior within the user population, or behavior within user groups, among other factors. These security values and security levels may be set and/or adapted using artificial intelligence and/or machine learning techniques, which are outside the scope of the present disclosure.

At operation 310, the computing device 200 determines whether the subsequent session security level is greater than or equal to a threshold session security level. The threshold session security level provides a minimum session security level to be maintained before a user authentication challenge (e.g., re-authentication action) is caused/triggered. The threshold session security level may vary between users within a user population (such as an enterprise) or between users of different user groups of a user population (with each user in the same user group having the same initial session security level). Alternatively, the threshold session security level may be the same for all users within a user population.

At operation 312, the computing device 200 permits (e.g., allows) the requested user action and adjusts the session security level based on the security value of the requested user action in response to a determination that the subsequent session security level is greater than or equal to a threshold session security level. As described above, the security value of the requested user action may vary.

At operation 314, the computing device 200 causes a user authentication challenge (e.g., re-authentication action) in response to a determination that the subsequent session security level is less than the threshold session security level. In performing the user authentication challenge, the user authentication challenge typically comprises prompting a user of the computing device 200 for (user) authentication information. The authentication information may comprise a shared secret (e.g., password or personal identification number (PIN)) challenge, biometric challenge, or a combination thereof. The user may be given a number of attempts, a duration of time, or both ("required authentication parameters"), to successfully enter matching authentication information. The authentication information and required authentication parameters are referred to as authentication criteria. If matching authentication information is not entered within required authentication parameters (if any), a further security action may be performed. The further security action may comprise one or more of adjusting the session security level by a predetermined amount or to a predetermined amount, locking the computing device 200, ending the session or logging the user of the session, performing a partial or complete data wipe of the memory of the computing device 200, or other security action. A notification of the unsuccessful user authentication challenge.

The required authentication parameters may vary based on one or a number of factors including the security value of the attempted action, the type of computing device 200 (e.g., handheld device vs. personal computer, etc.), the current location (e.g., home, work, in-transit, secure, insecure, etc.), the current session security level, the threshold security level, past user behavior, or predicted user behavior predicted by a behavior model. For example, the type of authentication information and the number of attempts and/or duration of time allocated to perform the re-authentication action may vary. The complexity of the requested authentication information possibly increasing with a determined risk based on the full context of the attempted action, and the number of attempts and/or duration of time allocated to perform the re-authentication action possibly decreasing with the determined risk. Examples of authentication information comprise a one-factor password or PIN entered via touchscreen or keyboard, facial recognition performed by facial scanner and/or camera, fingerprint sensed via a fingerprint sensor, a second-factor or a one-time password or PIN entered via touchscreen or keyboard, gait sensed via tacit monitoring via accelerometer or other motion sensor, ambient noise sensed by microphone or other audio sensor, or voice recognition performed via voice sample acquired via microphone.

At operation 316, the computing device 200 determines whether the user authentication challenge was successful, i.e. whether matching authentication information within required authentication parameters, if any (e.g., within a permitted number of attempts, within a permitted duration, etc.).

In response to a successful user authentication challenge, operations proceed to operation 312 at which the computing device 200 permits the requested user action and adjusts the session security level based on the security value of the requested user action as described above. The session security level may also be adjusted (increased) by an amount based on the security value of the successful user authentication challenge.

As noted above, the security value of a successful user authentication challenge may be a predetermined amount. Alternatively, the security value of a successful user authentication challenge may raise the session security level to a predetermined amount, such as the initial session security level for the user. In such cases, the session security level is raised to the predetermined amount in response to the successful user authentication challenge which is then adjusted by the security value of the requested user action. For example, if the initial session security level for the user is 1,000, the threshold session security level is 500, and the session security level was 400 at the time of a requested user action having a security value of 50, a user authentication challenge would be triggered because the session security level of 400 is below the threshold session security level of 500. In response to a successful user authentication challenge, the session security level would be increased to 1,000 and then adjusted by the security value of the requested user action of 50, resulting in an adjusted session security level of 950.

In an alternative, the session security level may be adjusted (increased) by an amount based on the security value of the successful user authentication challenge instead of the session security level based on the security value of the requested user action.

At operation 318, the computing device 200 rejects the request/requested user action in response to an unsuccessful user authentication challenge. The session security level may also be adjusted (decreased) by an amount based on the security value of the unsuccessful user authentication challenge. The computing device 200 may also be locked in response to the unsuccessful user authentication challenge. To unlock the computing device 200, a more complex or higher security secondary user authentication challenge may be presented to the user. The more complex or higher security secondary user authentication challenge may require additional factors or layers of authentication (e.g., multifactor authentication vs. simple factor authentication in the context of an in-session user authentication challenge triggered by an explicit security action), a more secure of challenging type authentication (e.g., biometric information rather than password or PIN entry), a more challenging form of authentication (e.g., secondary, more complex password vs. primary, simpler password; facial scan vs. fingerprint scan, etc.), or a combination thereof. The computing device 200 is unlocked in response to successful secondary user authentication. However, the computing device 200 remains unlocked in response to unsuccessful secondary user authentication.

Although the foregoing example embodiment is based on detected requests to perform a user action, the method may also be applied to a behavior model for the user. The behavior model may be learned and adapted using artificial intelligence and/or machine learning techniques, which are outside the scope of the present disclosure. The behavior model may predict a set of one or more likely future actions. The computing device 200 or access control server 110 (the "access control system") may determine whether to permit or allow an attempted action based on the set of one or more likely future actions predicted by the behavior model. The access control system may increase or decrease the sessions security level based on the set of one or more likely future actions predicted by the behavior model within allowable parameters for the user based on past user behavior. This is referred to as a behavioral adjusted session security level. This may reduce the likelihood of trigger user authentication challenges and thereby reduce the likelihood of interference with user behavior and user work efficiency. However, user authentication challenges may still be caused or invoked if the actual user behavior deviates from the prediction of the behavior model in a way that increases risk because the security costs of performing actions of relatively higher risk than that predicted by the behavior model will reduce the session security level faster than that accommodated by the behavioral adjusted session security level.

Figure 3B:
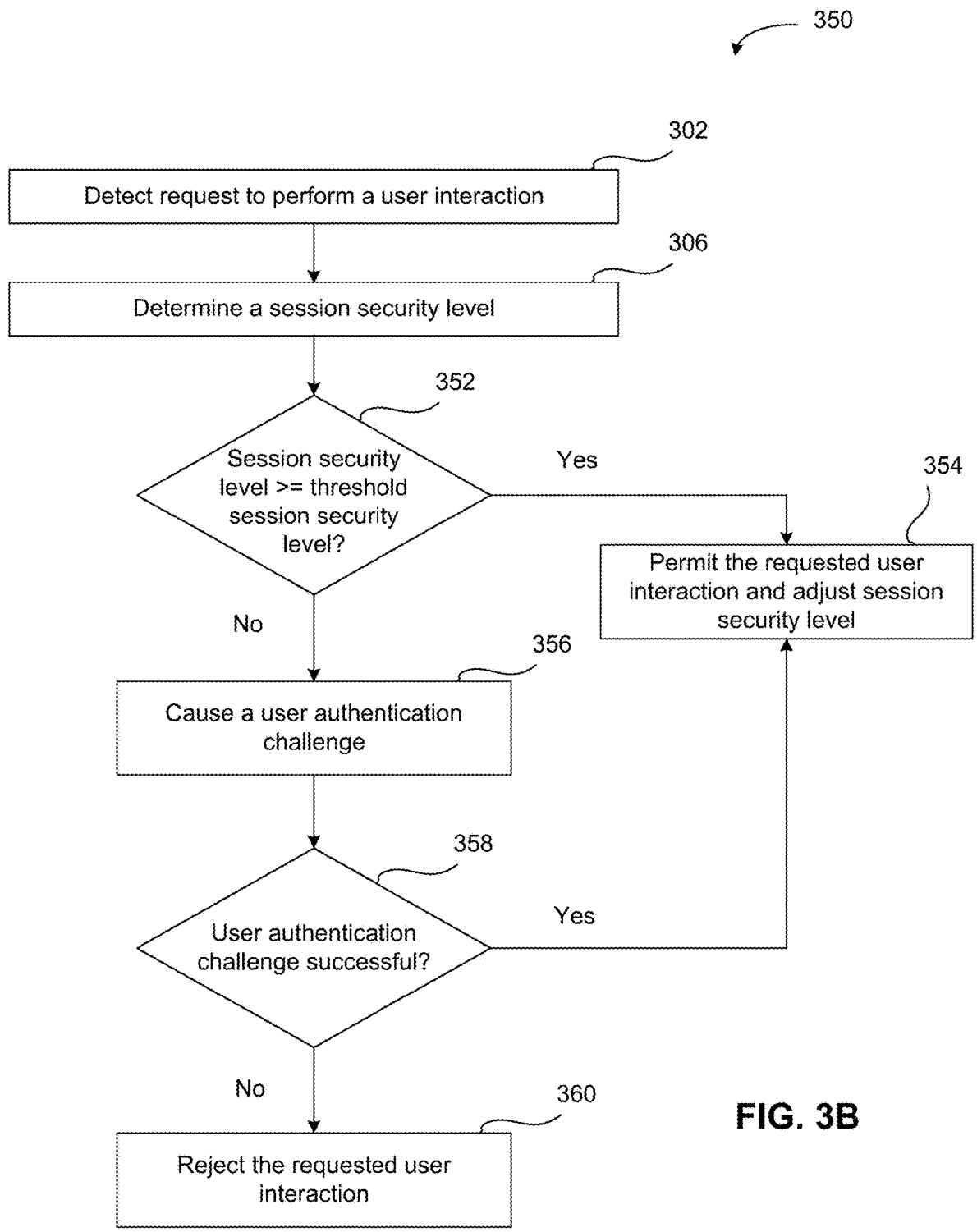
FIG. 3B is a flowchart of a continuous authentication method in accordance with another example embodiment of the present disclosure.

Referring now to FIG. 3B a continuous authentication method 350 in accordance with another example embodiment of the present disclosure will be described. The method 350 may be carried out by software executed, for example, by a processor 204 of a computing device 200 illustrated in FIG. 2. The method 350 is performed within a session. The method 350 differs from the method 300 in that the determination whether to permit the requested user action is based on the current session security level and the security value of the requested user action rather than the adjusted session security level after the requested action is performed.

At operation 302, the computing device 200 detects a request to perform a user action as described above.

At operation 306, the computing device 200 determines the current session security level as described above. As described above, the session security level varies throughout the session in response to various user actions.

At operation 352, the computing device 200 determines whether the current session security level is greater than or equal to the threshold session security level.

At operation 354, the computing device 200 permits (e.g., allows) the requested user action and adjusts the session security level based on the security value of the requested user action in response to a determination that the current session security level is greater than or equal to a threshold session security level. As described above, the security value of the requested user action may vary.

At operation 356, the computing device 200 causes a user authentication challenge in response to a determination that the current session security level is less than the threshold session security level.

At operation 358, the computing device 200 determines whether the user authentication challenge was successful, i.e. whether matching authentication information within required authentication parameters, if any (e.g., within a permitted number of attempts, within a permitted duration, etc.)

In response to a successful user authentication challenge, operations proceed to operation 354 at which the computing device 200 permits the requested user action and adjusts the session security level based on the security value of the user action as described above. The session security level may also be adjusted (increased) by an amount based on the security value of the successful user authentication challenge.

In an alternative, the session security level may be adjusted (increased) by an amount based on the security value of the successful user authentication challenge instead of the session security level based on the security value of the requested user action.

At operation 360, the computing device 200 rejects the request/requested user action in response to an unsuccessful user authentication challenge. The session security level may also be adjusted (decreased) by an amount based on the security value of the unsuccessful user authentication challenge. The computing device 200 may also be locked in response to the unsuccessful user authentication challenge. To unlock the computing device 200, a more complex or higher security secondary user authentication challenge may be presented to the user.

General

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A continuous authentication method, comprising:
   determining a security value of a requested user action;
   in response to the request to perform the user action, determining a subsequent session security level based on the security value of the requested user action and a session security level;
   in response to a determination that the subsequent session security level is greater than or equal to a threshold session security level, permitting the requested user action and adjust the session security level based on the security value of the requested user action; and
   in response to a determination that the subsequent session security level is less than the threshold session security level, causing a user authentication challenge:
      in response to a successful user authentication challenge, permitting the requested user action and adjust the session security level based on one or both of the security value of the requested user action and a security value of a successful user authentication challenge; and
      in response to an unsuccessful user authentication challenge, rejecting the user action.

2. The continuous authentication method of claim 1, wherein the requested user action is of a particular user action type in a plurality of user action types, wherein each type of user action has a security value, wherein the security value of each type of user action is based on a time of inactivity measured from a last user action of the respective type.

3. The continuous authentication method of claim 2, wherein the security value is gradually increased based on the time of inactivity measured from the last user action of the respective type.

4. The continuous authentication method of claim 1, wherein the session security level is based on a time of inactivity measured from a last user action.

5. The continuous authentication method of claim 4, wherein the session security level is gradually decreased based on the time of inactivity measured from the last user action.

6. The continuous authentication method of claim 1, wherein the requested user action is of a particular user action type in a plurality of user action types, wherein each user action type is an explicit security action, an implicit security action, or a non-security action.

7. The continuous authentication method of claim 6, wherein an explicit security action comprises a re-authentication action, an implicit security action comprises a non-resource specific user action, and a non-security action comprises a resource specific user action.

8. The continuous authentication method of claim 7, wherein an implicit security action comprises any one or more of session information or biometric information.

9. The continuous authentication method of claim 8, wherein the biometric information comprises any one or more of a typing speed, a typing cadence, a clicking speed, a clicking cadence, gait, finger print or eye scan.

10. The continuous authentication method of claim 8, wherein the session information comprises any one or more of an idle time duration, a user activity rate, or a session duration.

11. The continuous authentication method of claim 7, wherein the non-security actions comprises any one of a document access or idle time duration.

12. The continuous authentication method of claim 11, wherein the document access comprises any one or more of a document read, a document write, a document copy, a document delete, a document move, or a document profile change.

13. The continuous authentication method of claim 1, wherein the security value is based at least in part on a resource associated with the user action.

14. The continuous authentication method of claim 1, wherein the session security level is associated with a user account of the session.

15. The continuous authentication method of claim 1, wherein the security value is dynamically determined based on the user actions within the session.

16. The continuous authentication method of claim 1, wherein the session security level is increased in response to the security value being positive, wherein the session security level is decreased in response to the security value being negative, and wherein the session security level is unchanged in response to the security value being neutral.

17. The continuous authentication method of claim 1, wherein the session security level is adjusted in response to each permitted user action.

18. A continuous authentication method, comprising:
receiving a request to perform a user action;
in response to a determination that a session security level is greater than or equal to a threshold session security level, permitting the requested user action and adjust the session security level based on a security value of the requested user action; and
in response to a determination that the session security level is less than the threshold session security level, causing a user authentication challenge:
in response to a successful user authentication challenge, permitting the requested user action and adjust the session security level based on one or both of the security value of the requested user action and a security value of a successful user authentication challenge; and
in response to an unsuccessful user authentication challenge, rejecting the user action.

19. The continuous authentication method of claim 18, wherein the requested user action is of a particular user action type in a plurality of user action types, wherein each type of user action has a security value, wherein the security value of each type of user action is based on a time of inactivity measured from a last user action of the respective type.

20. The continuous authentication method of claim 19, wherein the security value is gradually increased based on the time of inactivity measured from the last user action of the respective type.

* * * * *